US012632171B2

(12) United States Patent
Kim

(10) Patent No.: US 12,632,171 B2
(45) Date of Patent: May 19, 2026

(54) MEMORY DEVICE USING MULTISTAGE ACCELERATION, OPERATING METHOD OF MEMORY DEVICE, AND ELECTRONIC DEVICE INCLUDING THE SAME

(71) Applicant: SAMSUNG ELECTRONICS CO., LTD., Suwon-si (KR)

(72) Inventor: Jinhyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/614,368

(22) Filed: Mar. 22, 2024

(65) Prior Publication Data

US 2024/0319871 A1     Sep. 26, 2024

(30) Foreign Application Priority Data

Mar. 24, 2023     (KR) ........................ 10-2023-0039280

(51) Int. Cl.
*G06F 3/00*     (2006.01)
*G06F 3/06*     (2006.01)
*G06F 12/02*     (2006.01)

(52) U.S. Cl.
CPC .......... *G06F 3/0604* (2013.01); *G06F 3/0629* (2013.01); *G06F 3/0673* (2013.01); *G06F 3/0601* (2013.01); *G06F 3/0614* (2013.01); *G06F 3/0656* (2013.01); *G06F 3/0658* (2013.01); *G06F 3/0659* (2013.01); *G06F 12/0207* (2013.01); *G06F 12/0284* (2013.01)

(58) Field of Classification Search
None
See application file for complete search history.

(56) References Cited

U.S. PATENT DOCUMENTS

| | | |
|---|---|---|
| 7,107,412 B2 | 9/2006 | Klein et al. |
| 9,965,187 B2 | 5/2018 | Gokhale et al. |
| 10,185,499 B1 | 1/2019 | Wang et al. |
| 10,762,012 B2 | 9/2020 | Lee |
| 2021/0034957 A1 | 2/2021 | Rhu et al. |
| 2021/0150770 A1 | 5/2021 | Appu et al. |
| 2021/0203704 A1 | 7/2021 | Pohl |

(Continued)

FOREIGN PATENT DOCUMENTS

WO     2021/202160 A1     10/2021

OTHER PUBLICATIONS

Extended European Search report dated Jul. 2, 2024, issued by the European Patent Office in European Application No. 24165245.2.

(Continued)

*Primary Examiner* — Midys Rojas
(74) *Attorney, Agent, or Firm* — Sughrue Mion, PLLC

(57)     ABSTRACT

An electronic device is provided. The electronic host includes: a host; a memory package including a plurality of memory devices and a first accelerator circuit configured to receive first data from the plurality of memory devices and perform a coarse acceleration operation based on the first data to obtain second data; and a memory controller including a second accelerator circuit configured to receive the second data from the first accelerator circuit and perform a fine acceleration operation based on a neural network and the second data to obtain an inference result.

20 Claims, 16 Drawing Sheets

(56) References Cited

U.S. PATENT DOCUMENTS

| | | |
|---|---|---|
| 2021/0240797 A1 | 8/2021 | Rashid et al. |
| 2021/0271680 A1 | 9/2021 | Lee et al. |
| 2022/0215871 A1 | 7/2022 | Kim et al. |
| 2025/0139434 A1* | 5/2025 | Rhu ........................ G06N 3/045 |

OTHER PUBLICATIONS

Hwang et al., "Centaur: A Chiplet-based, Hybrid Sparse-Dense Accelerator for Personalized Recommendations", 2020 ACM/IEEE 47th Annual International Symposium on Computer Architecture (ISCA), pp. 968-981 (14 pages total).

Lee et al., "Hardware Architecture and Software Stack for PIM Based on Commercial DRAM Technology", 2021 ACM/IEEE 48th Annual International Symposium on Computer Architecture (ISCA), pp. 43-56 (14 pages total).

Iskandar et al., "Near-memory Computing on FPGAs with 3D-stacked Memories: Applications, Architectures, and Optimizations", ACM Transactions on Reconfigurable Technology and Systems, Dec. 2022, vol. 16, No. 1, Article 16, pp. 1-32 (32 pages total).

Yu et al., "Data Stream Oriented Fine-grained Sparse CNN Accelerator with Efficient Unstructured Pruning Strategy" Session 3B: VLSI for Machine Learning and Artificial Intelligence 1, GLSVLSI '22, Jun. 6-8, 2022, pp. 243-248 (6 pages total).

Yang et al., "Procrustes: a Dataflow and Accelerator for Sparse Deep Neural Network Training", 2020 53rd Annual IEEE/ACM International Symposium on Microarchitecture (MICRO), pp. 711-724 (14 pages total).

Jin Hyun Kim et al., "Aquabolt-XL HBM2-PIM, LPDDR5-PIM With In-Memory Processing, and AXDIMM With Acceleration Buffer," Hot Chips 33, IEEE, Digital Object Identifier 10.1109/MM. 2022.3164651, Apr. 5, 2022, pp. 20-30.

Liu Ke et al., "Near-Memory Processing in Action: Accelerating Personalized Recommendation With AxDIMM," In-Memory Computing, 2021 IEEE, Digital Object Identifier 10.1109/MM.2021. 3097700, Jul. 16, 2021, pp. 116-127.

* cited by examiner

Figure 2:
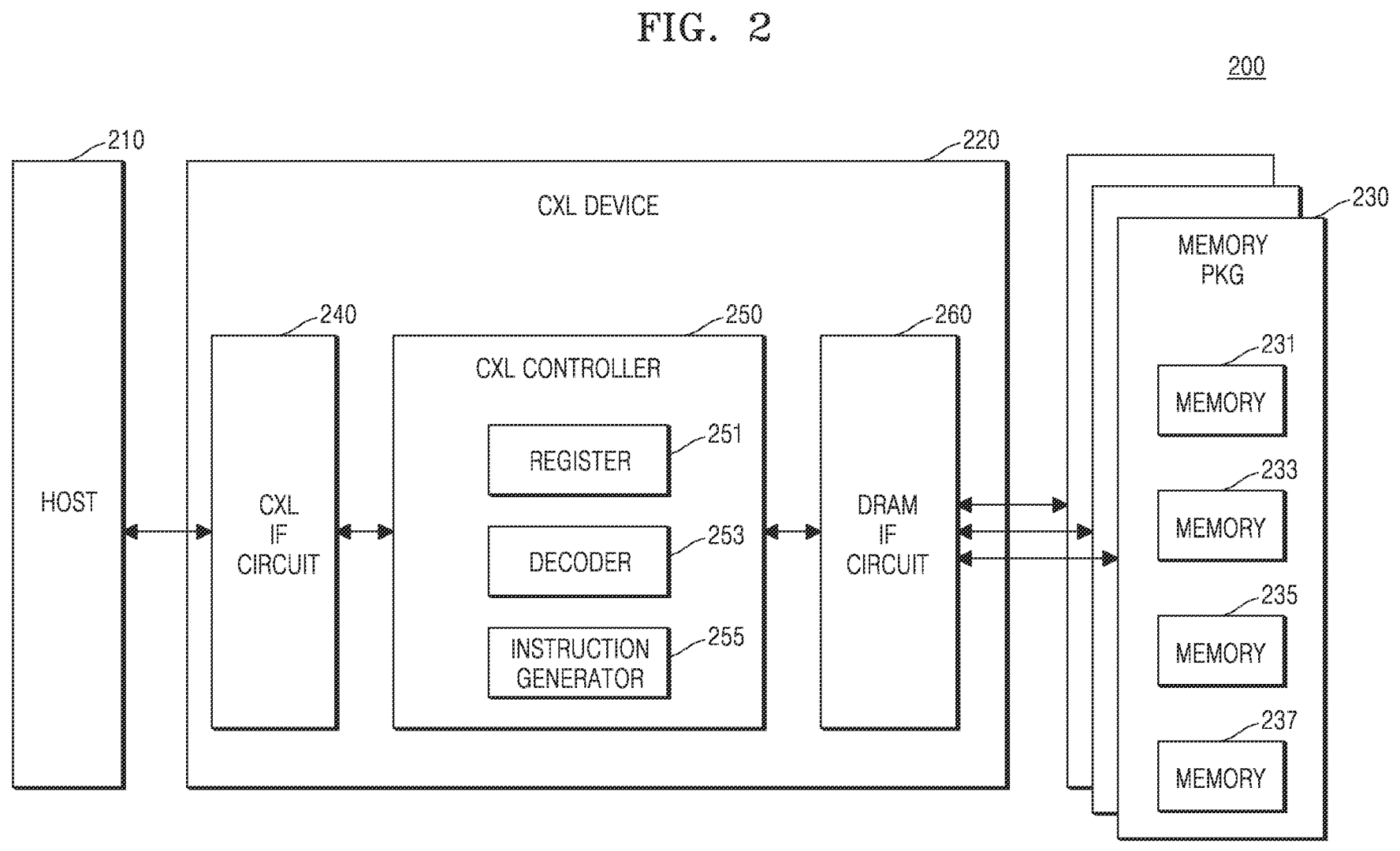

210 HOST

220 CXL DEVICE

240 CXL IF CIRCUIT

250 CXL CONTROLLER

251 REGISTER

253 DECODER

255 INSTRUCTION GENERATOR

260 DRAM IF CIRCUIT

230 MEMORY PKG

231 MEMORY

233 MEMORY

235 MEMORY

237 MEMORY

Figure 11:
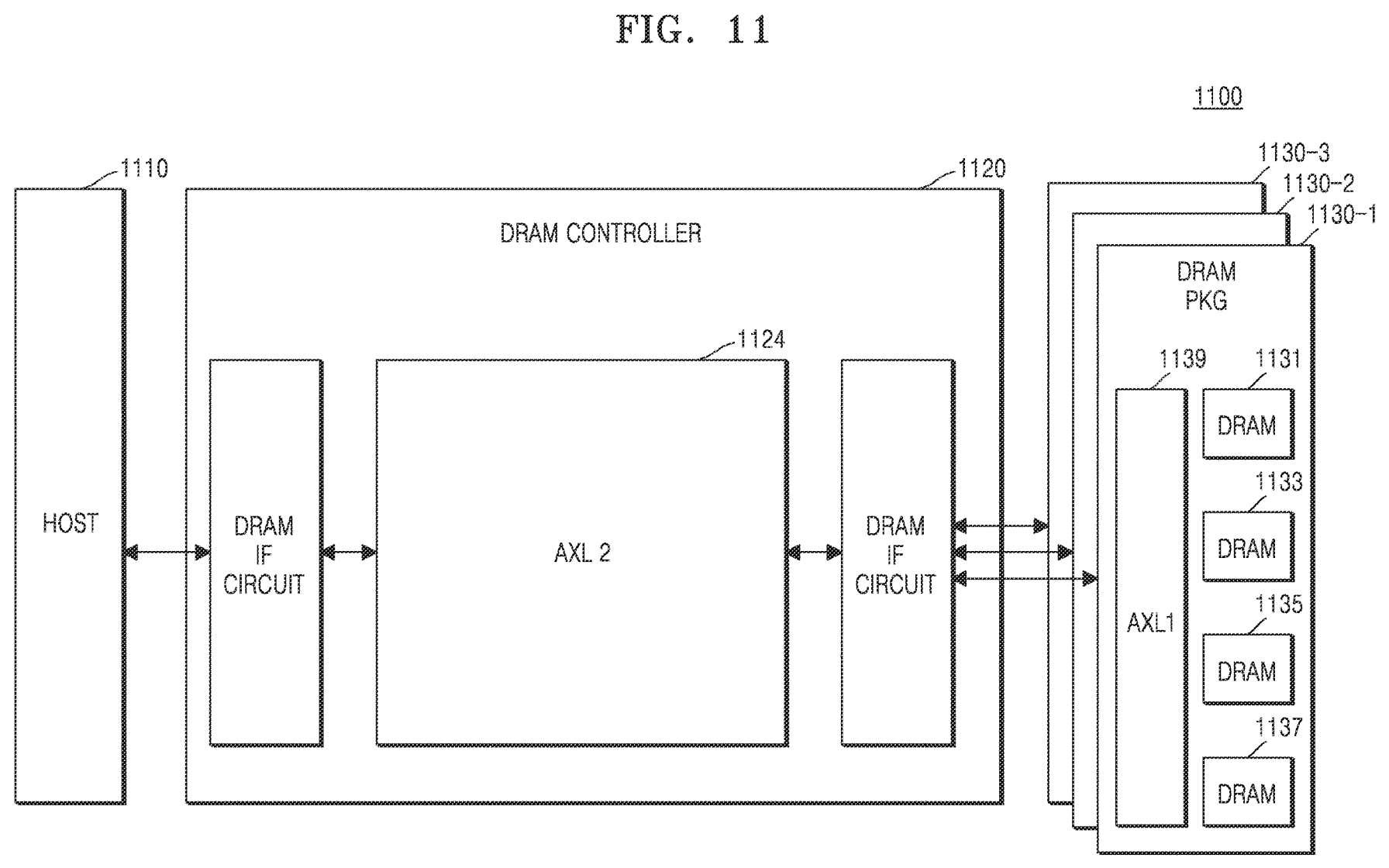

DRAM PKG

1131 — DRAM
1133 — DRAM
1135 — DRAM
1137 — DRAM

1139 — AXL1

1120 — DRAM CONTROLLER

DRAM IF CIRCUIT

1124 — AXL 2

DRAM IF CIRCUIT

1110 — HOST

FIG. 13

MEMORY DEVICE USING MULTISTAGE ACCELERATION, OPERATING METHOD OF MEMORY DEVICE, AND ELECTRONIC DEVICE INCLUDING THE SAME

CROSS-REFERENCE TO RELATED APPLICATION

This application claims priority to Korean Patent Application No. 10-2023-0039280, filed on Mar. 24, 2023, in the Korean Intellectual Property Office, the disclosure of which is incorporated by reference herein in its entirety.

BACKGROUND

The present disclosure relates to a memory device, and more particularly, to a memory device using multistage acceleration, an operating method of the memory device, and an electronic device including the memory device.

The capacity and speed of a semiconductor memory device used in a high-performance electronic system are increasing. As an example of the semiconductor memory device, a dynamic random access memory (DRAM) which is a volatile memory determines data by a charge stored in a capacitor.

The DRAM may be used for various purposes, and as an example, may be used to store data used for various types of operation processing or to store operation processing results. Additionally, there is a need to efficiently use the DRAM in processing a vast amount of operation such as a neural network operation.

SUMMARY

One or more embodiments provide a memory device using multistage acceleration by performing coarse acceleration to convert sparse data into dense data through a first accelerator disposed inside a memory package, and performing fine acceleration to generate an output of a neural network by using the dense data through an accelerator disposed inside a device controller, an operating method of the memory device, and an electronic device including the memory device.

According to an aspect of an embodiment, an electronic device includes: a host; a memory package including a plurality of memory devices and a first accelerator circuit configured to receive first data from the plurality of memory devices and perform a coarse acceleration operation based on the first data to obtain second data; and a memory controller including a second accelerator circuit configured to receive the second data from the first accelerator circuit and perform a fine acceleration operation based on a neural network and the second data to obtain an inference result.

According to another aspect of an embodiment, a memory controller includes: a register configured to receive instructions from a host; a decoder configured to decode the instructions; a command generator configured to generate a command to be provided to a memory package based on the decoded instructions, wherein the memory package includes a plurality of memory devices; and a first accelerator circuit configured to receive second data from the memory package and perform first operations for an inference operation based on a neural network. The second data is data obtained as a result of performing second operations on first data stored in the plurality of memory devices through a second accelerator circuit provided in the memory package.

According to another aspect of an embodiment, an operating method of a memory controller connected to a host and a memory package including a plurality of memory devices, includes: receiving output data from a first accelerator circuit which as performed a coarse acceleration operation on sparse data stored in the plurality of memory devices to obtain the output data; obtaining an inference result by performing a fine acceleration operation on the output data by using a second accelerator circuit inside the memory controller; and providing the inference result to the host.

BRIEF DESCRIPTION OF DRAWINGS

The above and other aspects and features will be more clearly understood from the following description of embodiments, taken in conjunction with the accompanying drawings, in which:

FIG. 2 is a block diagram illustrating a memory system according to a comparative example;

FIG. 3 is a block diagram illustrating a system according to an embodiment;

FIG. 11 is a block diagram illustrating a system according to an embodiment;

FIG. 13 is a block diagram illustrating a system according to an embodiment.

DETAILED DESCRIPTION

Hereinafter, embodiments will be described in detail with reference to the accompanying drawings. Embodiments described herein are example embodiments, and thus, the present disclosure is not limited thereto, and may be realized in various other forms. Each example embodiment provided in the following description is not excluded from being associated with one or more features of another example or another embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
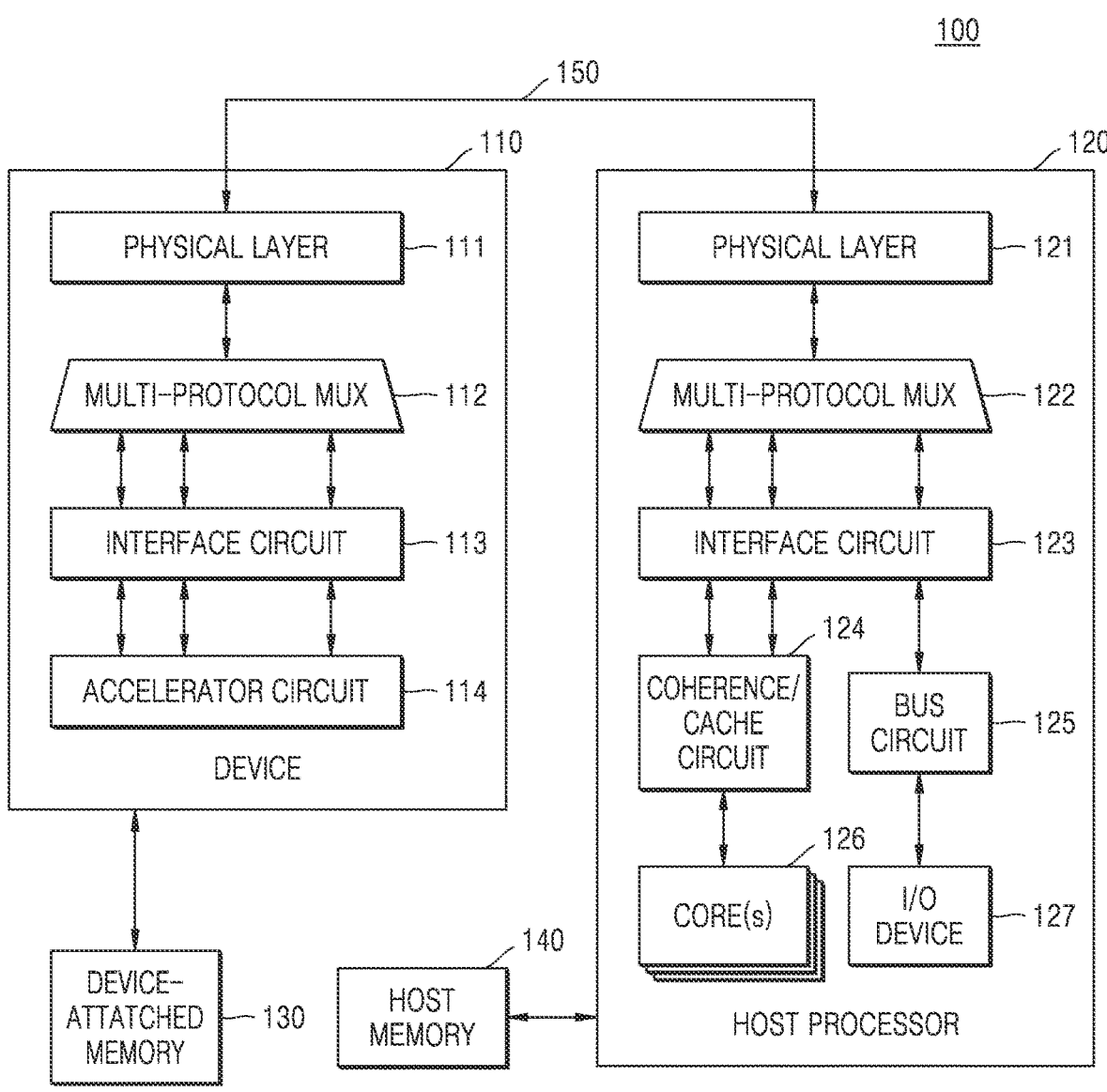
FIG. 1 is a block diagram illustrating a system according to an embodiment.

FIG. 1 is a block diagram illustrating a system 100 according to an embodiment.

Referring to FIG. 1, the system 100 may be any computing system (or a component included in a computing system) including a device 110 and a host processor 120 that communicate with each other. For example, the system 100 may be included in a stationary computing system such as a desktop computer, a server, a kiosk, etc., or may be included in a portable computing system such as a laptop computer, a mobile phone, a wearable device, etc. Further, in some embodiments, the system 100 may be included in a system-on-chip (SoC) or a system-in-package (SiP) in which the device 110 and the host processor 120 are implemented on a single chip or package.

As shown in FIG. 1, the system 100 may include the device 110, the host processor 120, a device-attached memory 130, and a host memory 140. According to various embodiments, the system 100 may not include the device-attached memory 130. Referring to FIG. 1, the device 110 and the host processor 120 may communicate with each other over a link 150 and may mutually transmit or receive messages and/or data over the link 150.

Some embodiments are described with reference to the link 150 based on the compute express link (CXL) specification supporting CXL protocols, but embodiments are not limited thereto, and the device 110 and the host processor 120, as non-limiting examples, may communicate with each other based on coherent interconnect technologies such as an XBus protocol, an NVLink protocol, an Infinity Fabric protocol, a cache coherent interconnect for accelerators (CCIX) protocol, a coherent accelerator processor interface (CAPI), etc.

In some embodiments, the link 150 may support multiple protocols, and messages and/or data may be transferred over the multiple protocols. For example, the link 150 may support CXL protocols including non-coherent protocols (e.g., CXL.io), coherent protocols (e.g., CXL.cache), and memory access protocols (or memory protocols) (e.g., CXL.mem). In some embodiments, the link 150 may, as non-limiting examples, support a protocol such as peripheral component interconnect (PCI), PCI express (PCIe), universal serial bus (USB), serial advanced technology attachment (SATA), etc. In this specification, the protocol supported by the link 150 may be referred to as an interconnection protocol.

The device 110 may refer to any device that provides useful functions to the host processor 120. In some embodiments, referring to the CXL specification 2.0, the device 110 may correspond to an accelerator supporting the CXL specification. For example, software executing on the host processor 120 may offload at least a part of computing and/or input/output (I/O) tasks to the device 110. In some embodiments, the device 110 may include at least one of a programmable component such as a graphics processing unit (GPU), a neural processing unit (NPU), etc., a component providing a fixed function such as an intellectual property (IP) core, or a reconfigurable component such as a field programmable gate array (FPGA), etc. As shown in FIG. 1, the device 110 may include a physical layer 111, a multi-protocol multiplexer 112, an interface circuit 113, and an accelerator circuit 114, and communicate with the device-attached memory 130.

The accelerator circuit 114 may perform useful functions that the device 110 provides to the host processor 120 and may be referred to as an accelerator logic. When the device-attached memory 130 is included in the system 100 as shown in FIG. 1, the accelerator circuit 114 may communicate with the device-attached memory 130. More specifically, the accelerator circuit 114 may communicate with the device-attached memory 130 based on a device-specific protocol which is independent of the link 150. Also, as shown in FIG. 1, the accelerator circuit 114 may communicate with the host processor 120 through the interface circuit 113 by using multiple protocols.

The interface circuit 113 may determine one of multiple protocols based on messages and/or data for communication between the accelerator circuit 114 and the host processor 120. The interface circuit 113 may be connected to at least one protocol queue included in the multi-protocol multiplexer 112, and may exchange messages and/or data with the host processor 120 through the at least one protocol queue. In some embodiments, the interface circuit 113 and the multi-protocol multiplexer 112 may be integrated into one component. In some embodiments, the multi-protocol multiplexer 112 may include multiple protocol queues respectively corresponding to multiple protocols supported by the link 150. Also, in some embodiments, the multi-protocol multiplexer 112 may arbitrate between communications by different protocols and provide selected communications to the physical layer 111. In some embodiments, the physical layer 111 may be connected to a physical layer 121 of the host processor 120 through a single interconnect, a bus, a trace, etc.

The host processor 120 may be a main processor of the system 100, such as a central processing unit (CPU), and, in some embodiments, may correspond to a host processor (or a host) of the CXL specification. As shown in FIG. 1, the host processor 120 may be connected to the host memory 140, and may include a physical layer 121, a multi-protocol multiplexer 122, an interface circuit 123, a coherence/cache circuit 124, a bus circuit 125, at least one core 126, and an I/O device 127.

The at least one core 126 may execute instructions and may be connected to the coherence/cache circuit 124. The coherence/cache circuit 124 may include a cache hierarchy and may also be referred to as a coherence/cache logic. As shown in FIG. 1, the coherence/cache circuit 124 may communicate with the at least one core 126 and the interface circuit 123. For example, the coherence/cache circuit 124 may enable communication over two or more protocols including a coherence protocol and a memory access protocol. In some embodiments, the coherence/cache circuit 124 may include a direct memory access (DMA) circuit. The I/O device 127 may be used to communicate with the bus circuit 125. For example, the bus circuit 125 may be a PCIe logic, and the I/O device 127 may be a PCIe I/O device.

The interface circuit 123 may enable communication between the device 110 and components of the host processor 120, such as the coherence/cache circuit 124 and the bus circuit 125. In some embodiments, the interface circuit 123 may enable communication of messages and/or messages between components of the host processor 120 and the device 110 according to multiple protocols, such as a non-coherent protocol, a coherent protocol, and a memory protocol. For example, the interface circuit 123 may determine one of multiple protocols based on messages and/or data for communication between components of the host processor 120 and the device 110.

The multi-protocol multiplexer 122 may include at least one protocol queue. The interface circuit 123 may be connected to at least one protocol queue, and may exchange messages and/or data with the device 110 through the at least one protocol queue. In some embodiments, the interface circuit 123 and the multi-protocol multiplexer 122 may be integrated into one component. In some embodiments, the multi-protocol multiplexer 122 may include multiple protocol queues respectively corresponding to multiple protocols supported by the link 150. Also, in some embodiments, the multi-protocol multiplexer 122 may arbitrate between communications by different protocols and provide selected communications to the physical layer 121.

FIG. 2 is a block diagram illustrating a memory system 200 according to a comparative example.

Referring to FIG. 2, the memory system 200 may include a host 210, a CXL device 220, and a plurality of dynamic random access memory (DRAM) packages 230.

Referring to FIG. 1 together, the host 210 may correspond to the host processor 120 shown in FIG. 1. The CXL device 220 may correspond to the device 110 shown in FIG. 1. The plurality of DRAM packages 230 may correspond to the device-attached memory 130 shown in FIG. 1. For example, each of the plurality of DRAM packages 230 may include a plurality of DRAMs 231, 233, 235, and 237.

The CXL device 220 may include a CXL interface circuit 240, a CXL controller 250, and a DRAM interface circuit 260.

The CXL interface circuit 240 may communicate with the host 210. That is, the CXL interface circuit 240 may arbitrate signal exchange between the host 210 and the CXL device 220. Referring to FIG. 1 together, the CXL interface circuit 240 may correspond to the interface circuit 113 included in the device 110 shown in FIG. 1. For example, the CXL interface circuit 240 may support a PCIe protocol.

The CXL controller 250 may control all operations of the CXL device 220. For example, the CXL controller 250 may receive an instruction and a configuration from the host 210 and store the instruction and the configuration in a register 251. The CXL controller 250 may identify decoding information of the instruction requested by the host 210 by providing the instruction stored in the register 251 to a decoder 253. The CXL controller 250 may provide decoding information of the instruction from the decoder 253 to a command generator 255. The command generator 255 may generate a command suitable for DRAM based on the decoding information of the instruction and transmit the generated command to the DRAM interface circuit 260.

The DRAM interface circuit 260 may communicate with the plurality of DRAM packages 230. For example, the DRAM interface circuit 260 may arbitrate signal exchange between the CXL device 220 and the plurality of DRAM packages 230. For example, the DRAM interface circuit 260 may provide a control signal for controlling the plurality of DRAM packages 230 to the plurality of DRAM packages 230 based on the command generated by the command generator 255.

According to the comparative example, data transmission/reception speed between the host 210 and the CXL device 220 may be limited by the CXL interface circuit 240 based on the PCIe protocol. For example, the PCIe protocol may be PCIe5, and a data transfer speed between the host 210 and the CXL device 220 may be 64 GB/s. For example, when the CXL controller 250 is connected to the plurality of DRAM packages 230, each of which includes 2-channel and 8-rank 8GB DRAMs, data transmission/reception speed between the CXL device 220 and the plurality of DRAM packages 230 may be 128 GB/s. However, even when the number of channels of the plurality of DRAM packages 230 is increased or the rank is increased, the data transmission/reception speed between the host 210 and the CXL device 220 remains limited to 64 GB/s by PCIe5, thereby limiting performance of the entire system.

Also, when the host 210 drives a neural network, data transmission and reception between the host 210 and the plurality of DRAM packages 230 through the CXL device 220 may be very frequent, which may cause a bottleneck phenomenon due to the speed of the CXL interface circuit 240 which is relatively lower than that of the DRAM interface circuit 260. Thus, performance of the entire system may be affected.

Figure 3:
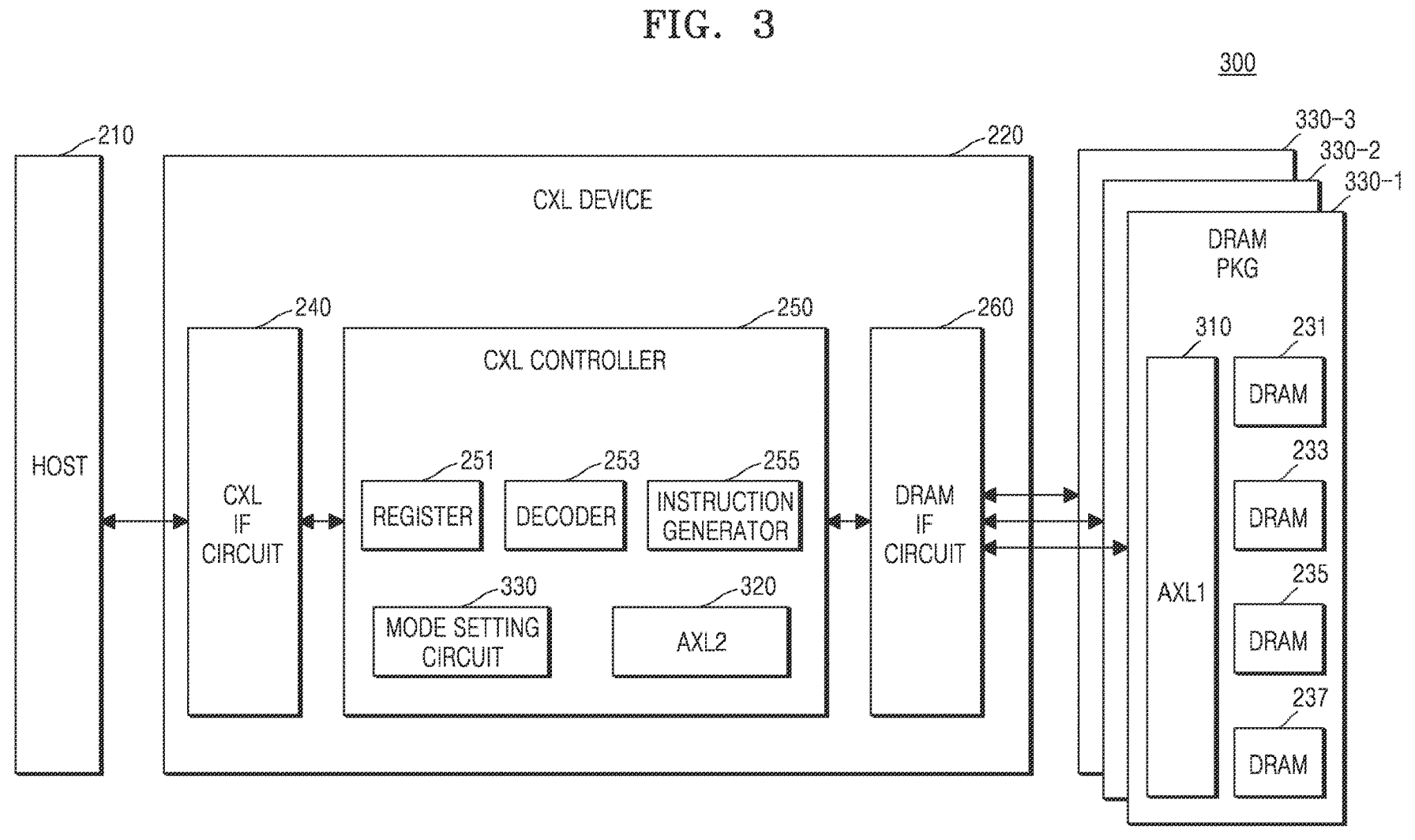

FIG. 3 is a block diagram illustrating a system 300 according to an embodiment.

Referring to FIG. 3, the system 300 may additionally include a first accelerator AXL1 310, a second accelerator AXL2 320 and a mode setting circuit 330 in addition to the memory system 200. That is, the system 300 may further include the first accelerator AXL1 310 in each of the plurality of DRAM packages 330-1 to 330-3, and may further include the second accelerator AXL2 320 in the CXL controller 250. Additionally, the first system 300 may perform multistage acceleration by using the first accelerator 310 and the second accelerator 320. The multistage acceleration may include at least first acceleration by the first accelerator 310 and second acceleration by the second accelerator 320.

According to some embodiments, the first accelerator 310 may be included in each of the plurality of DRAM packages 330-1 to 330-3. The first accelerator 310 may be referred to as various terms including a first acceleration circuit, a first acceleration buffer, a preprocessing accelerator, a pre-accelerator, etc. The first accelerator 310 may receive data from the plurality of DRAMs 231, 233, 235, and 237 and perform a primary operation based on the received data. The data received from the plurality of DRAMs 231, 233, 235, and 237 may be data (e.g., a sparse matrix) in which a data space is very small compared to the entire space.

The first accelerator 310 may perform the primary operation. For example, the primary operation may include at least a zeroing operation for processing meaningless data as 0 and a pruning operation for collecting only valid data (e.g., other than 0) from among a plurality of pieces of data. However, operations that the first accelerator 310 may perform are not limited to the zeroing and pruning operations, and may include all of various operations capable of processing sparse data. The first accelerator 310 may convert received sparse data into dense data by performing the primary operation. According to various embodiments, the primary operation may be referred to as various terms including primary acceleration, coarse acceleration, pre-acceleration, data filtering operation, data densification operation, etc.

The second accelerator 320 may perform a secondary operation. The second accelerator 320 may be referred to as various terms including a second acceleration circuit, a second acceleration buffer, a post-processing accelerator, a post-accelerator, etc. For example, the secondary operation may include an operation for generating an output by using the dense data received from the first accelerator 310. For example, the output may be a result value generated by a neural network receiving the dense data. The second accelerator 320 may provide the result value of the neural network to the host 210 by performing the secondary operation. According to various embodiments, the second-ary operation may be referred to as various terms including secondary acceleration, fine acceleration, following acceleration, object recognition operation, neural network operation, etc.

Figure 4A:
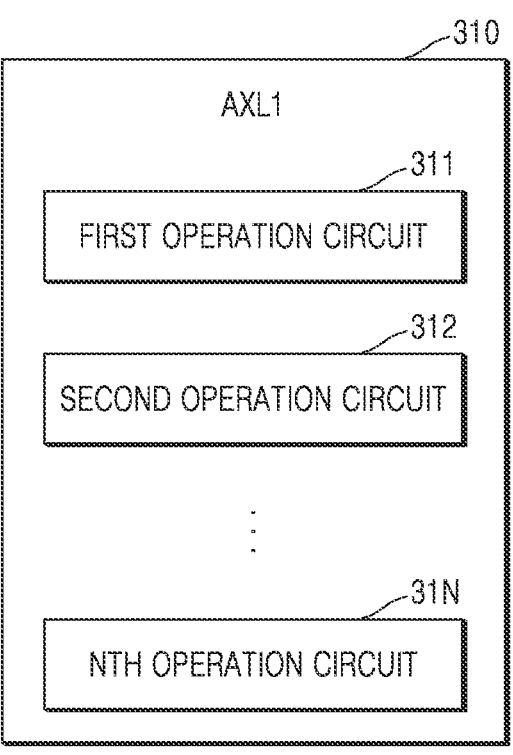
FIG. 4A is a block diagram of a first accelerator according to an embodiment.
Figure 4B:
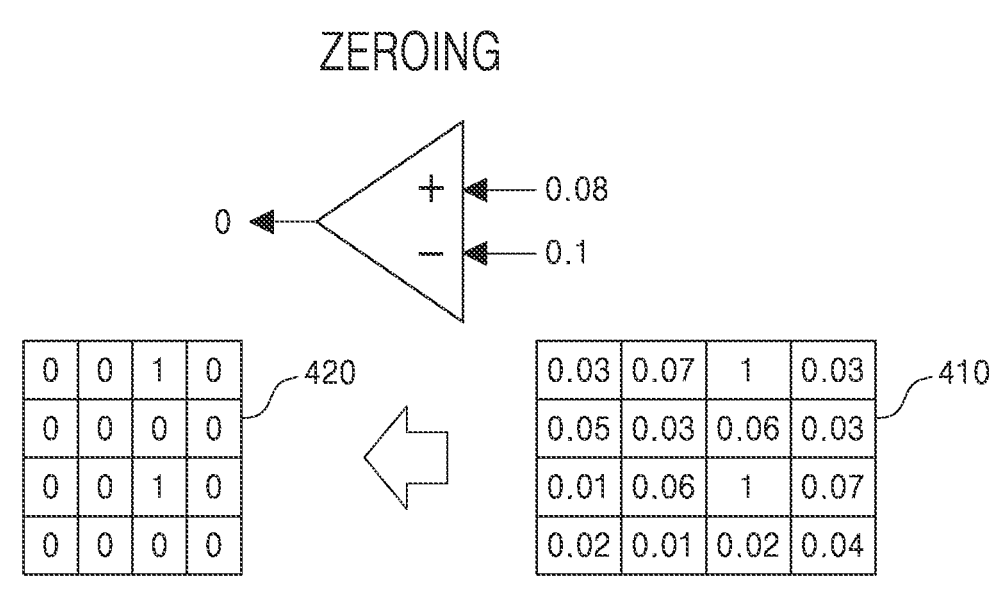
FIG. 4B illustrates an example of a first operation circuit according to an embodiment.
Figure 4C:
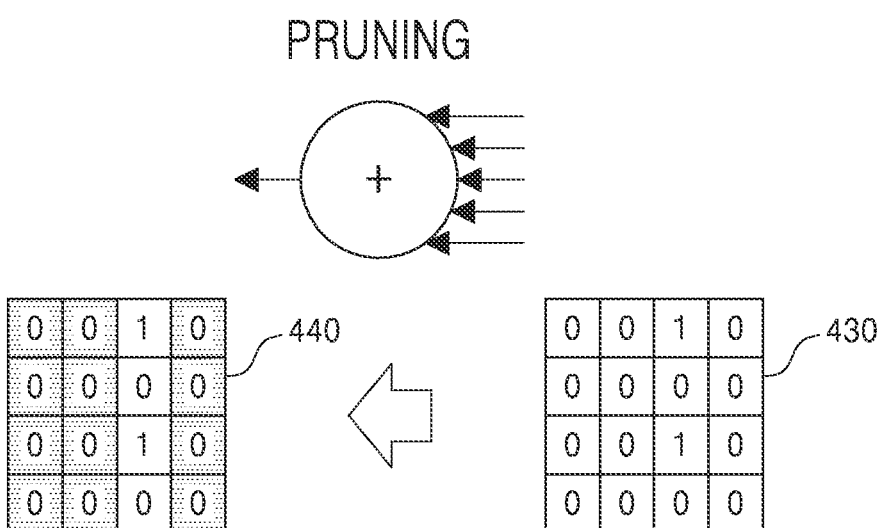
FIG. 4C illustrates an example of a second operation circuit according to an embodiment.

FIG. 4A is a block diagram of the first accelerator 310 according to an embodiment. FIG. 4B illustrates an example of a first operation circuit 311 according to an embodiment. FIG. 4C illustrates an example of a second operation circuit 312 according to an embodiment.

Referring to FIG. 4A, the first accelerator 310 may include the first operation circuit 311 and the second operation circuit 312 to an Nth operation circuit 31N. The first accelerator 310 may perform a primary operation on sparse data by using at least one of the first operation circuit 311 and the second operation circuit 312 to the Nth operation circuit 31N.

According to an embodiment, the first operation circuit 311 may correspond to an operation circuit for performing a zeroing operation. The zeroing operation is an operation for processing data smaller than a preset threshold value as 0. For example, the first operation circuit 311 may include at least one comparator. One input of the comparator may be the preset threshold value. Another input of the comparator may be sparse data (e.g., a sparse matrix). The first operation circuit 311 may perform the zeroing operation on the sparse matrix by repeatedly comparing each of elements constitut-ing the sparse matrix with the preset threshold value. For example, the first operation circuit 311 may compare each of all elements of a matrix 410 with the preset threshold value. Referring to FIG. 4B, the preset threshold value may be 0.08. The first operation circuit 311 may change each of the elements of the matrix 410 that are less than the preset threshold value of 0.08 to 0. For example, the first operation circuit 311 may change all elements of a first column, a second column, and a fourth column of the matrix 410, as well as the elements of the third column of the matrix 410, excluding elements greater than 0.08 (a first row and a third row), to zero by performing the zeroing operation. The first operation circuit 311 may filter noise, unnecessary data, or irrelevant data among the sparse data through the zeroing operation. The first operation circuit 311 may output a matrix 420 by changing the elements less than 0.08 of the matrix 410 to 0.

According to an embodiment, the second operation circuit 312 may correspond to an operation circuit for performing a pruning operation. The pruning operation is an operation for reducing the dimension of sparse data by removing data processed as 0 among the sparse data. The second operation circuit 312 may receive a matrix 430 as an input. For example, the matrix 430 may be the same as the matrix 420 obtained through the zeroing operation performed by the first operation circuit 311. The second operation circuit 312 may receive the matrix 430 and exclude valid data. The second operation circuit 312 may remove the remaining columns (a first column, a second column, and a fourth column) of the matrix 430, each of which does not contain valid data, leaving only a third column including the valid data. That is, the size of a matrix passing through the second operation circuit 312 may be reduced from a 4×4 size of the matrix 430 to a 4×1 size of the matrix 440. The first accelerator 310 is not limited to operation circuits which perform the zeroing operation and the pruning operation, and may further include additional operation circuits for performing various operations that may be used in a neural network.

Referring to FIGS. 4A to 4C, it is shown that the first to Nth operation circuits 311 to 31N included in the first accelerator 310 include pruning and zeroing operation cir-cuits of a lightening method of reducing the size of a deep learning model, but embodiments are not limited thereto. The first to Nth operation circuits 311 to 31N included in the first accelerator 310 may include operation circuits for performing various lightening methods of reducing the size of the deep learning model. For example, the Nth operation circuit 31N may correspond to an operation circuit for performing quantization that converts a weight expressed as a 32 bit floating point into a 16 bit floating point or an 8 bit integer type.

Figure 5A:
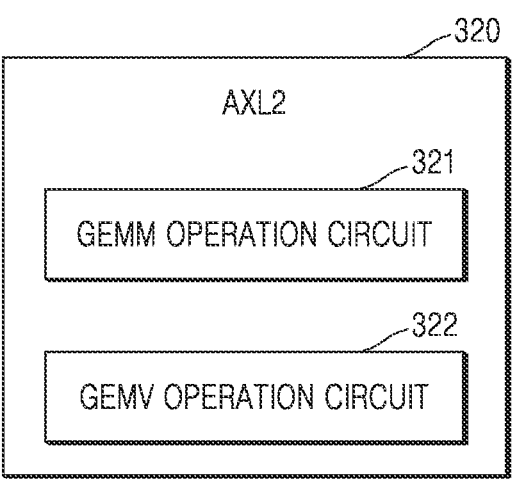
FIG. 5A is a block diagram of a second accelerator according to an embodiment.
Figure 5B:
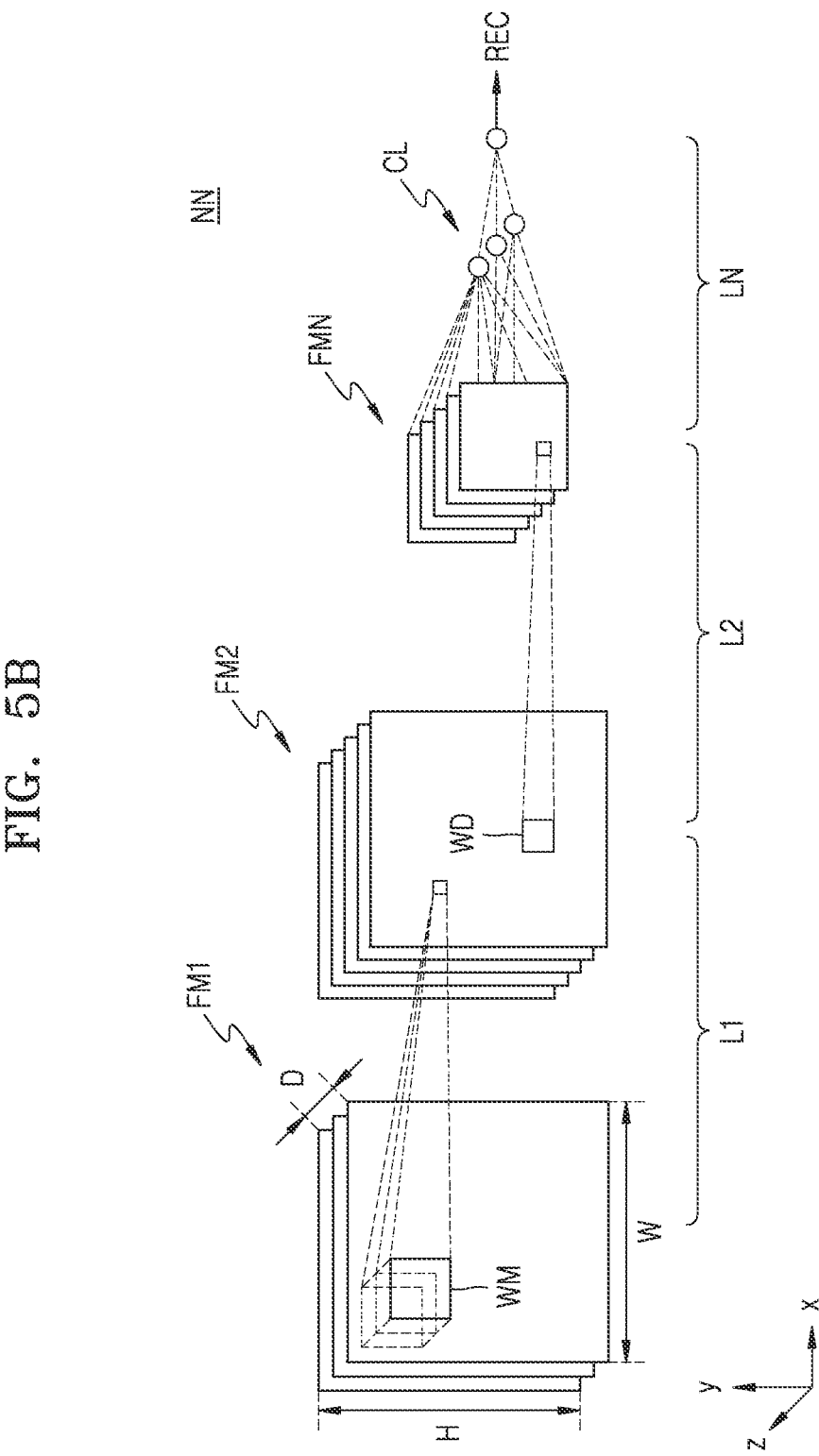
FIG. 5B is a diagram for explaining operation processing of a neural network according to an embodiment.

FIG. 5A is a block diagram of a second accelerator 320 according to an embodiment, and FIG. 5B is a diagram for explaining operation processing of a feature extraction mod-ule.

Referring to FIG. 5A, the second accelerator 320 may include operation circuits for performing operations neces-sary for performing an inference operation based on a neural network. For example, the second accelerator 320 may include a general matrix-matrix multiplication (GEMM) operation circuit 321 and a general matrix vector multipli-cation (GEMV) operation circuit 322. The GEMV operation circuit 322 may perform a matrix-to-vector multiplication operation. The GEMM operation circuit 321 may perform a matrix-to-matrix multiplication operation. The second accel-erator 320 may perform an inference operation based on a plurality of weight parameters and dense data received from the first accelerator 310 through the GEMV operation circuit 322 and the GEMM operation circuit 321. For example, the second accelerator 320 may simultaneously process a plu-rality of parallel operations.

Referring to FIG. 5B, an artificial neural network may include a plurality of layers L1 to LN. Each of the plurality of layers L1 to LN may be a linear layer or a non-linear layer, and according to an embodiment, at least one linear layer and at least one non-linear layer may be combined to be referred to as one layer. For example, a linear layer may include a convolution layer and a fully connected layer, and a non-linear layer may include a sampling layer, a pooling layer, and an activation layer.

For example, the first layer L1 may be a convolution layer, and the second layer L2 may be a sampling layer. The artificial neural network may further include an activation layer and may further include layers performing different types of operations.

Each of the plurality of layers L1 to LN may receive input image data or a feature map generated in a previous layer as an input feature map, and generate an output feature map by performing an operation on the input feature map. In this regard, the feature map means data expressing various characteristics of the input data. Each of the feature maps FM1, FM2, and FMN may have, for example, a 2D or 3D matrix form. Each of the feature maps FM1 to FMN may have a width W (also called a number of columns), a height H (also called a number of rows), and a depth D, which may respectively correspond to x, y, and z axes on coordinates. In this regard, the depth D may be referred to as the number of channels.

The first layer L1 may generate the second feature map FM2 by convolving the first feature map FM1 with a weight map WM. The weight map WM may filter the first feature map FM1 and may be referred to as a filter or a kernel. For example, the depth of the weight map WM, that is, the number of channels, may be equal to the depth D of the first feature map FM1, that is, the number of channels, and the same channels of the weight map WM and the first feature map FM1 may be convoluted. The weight map WM is shifted in a manner traversing the first feature map FM1 as a sliding window. A shifted amount may be referred to as a "stride length" or a "stride". During each shift, each of weights included in the weight map WM may be multiplied by and added to all feature values in a region overlapping the first feature map FM1. As the first feature map FM1 is convoluted with the weight map WM, one channel of the second feature map FM2 may be generated. Although one weight map WM is shown in FIG. 2, a plurality of weight maps may be actually convoluted with the first feature map FM1 to generate a plurality of channels of the second feature map FM2. In this regard, the number of channels of the second feature map FM2 may correspond to the number of weight maps.

The second layer L2 may generate the Nth feature map FMN by changing the spatial size of the second feature map FM2. For example, the second layer L2 may be a sampling layer. The second layer L2 may perform up-sampling or down-sampling, and may select part of data included in the second feature map FM2. For example, a 2D window WD may be shifted on the second feature map FM2 in units of the size (e.g., a 4*4 matrix) of the window WD, and a value of a specific position (e.g., a first row and a first column) may be selected in a region overlapping the window WD. The second layer L2 may output the selected data as data of the Nth feature map FMN. As another example, the second layer L2 may be a pooling layer. In this case, the second layer L2 may select the maximum value of feature values (or the average value of feature values) of the region overlapping the window WD in the second feature map FM2.

Accordingly, the Nth feature map FMN having a changed spatial size may be generated from the second feature map FM2. The number of channels of the Nth feature map FMN may be the same as the number of channels of the second feature map FM2. According to an embodiment, the operation speed of the sampling layer may be faster than that of the pooling layer, and the sampling layer may improve the quality of an output image (e.g., in terms of a peak signal to noise ratio (PSNR)). For example, because the operation by the pooling layer needs to calculate the maximum value or the average value, the operation time by the pooling layer may be longer than that by the sampling layer.

According to an embodiment, the second layer L2 is not limited to the sampling layer or the pooling layer. That is, the second layer L2 may be a convolutional layer similar to the first layer L1. The second layer L2 may generate the Nth feature map FMN by convoluting the second feature map FM2 with a weight map. In this case, the weight map on which the convolution operation is performed by the second layer L2 may be different from the weight map WM on which the convolution operation is performed by the first layer L1.

An Nth layer may generate an Nth feature map through the plurality of layers including the first layer L1 and the second layer L2. The Nth feature map may be input to a reconstruction layer located at a back end of an artificial neural network to which output data is output. The reconstruction layer may generate an output image based on the Nth feature map. In addition, the reconstruction layer may receive not only the Nth feature map, but also a plurality of feature maps such as the first feature map FM1 and the second feature map FM2, and generate the output image based on the plurality of feature maps.

The Nth layer LN may classify classes CL of the input data by combining the features of the Nth feature map FMN. In addition, the Nth layer LN may a recognition signal REC corresponding to the classes CL. For example, the input data may be image or video frame data. In this case, the Nth layer LN may extract the class CL corresponding to an object included in an image represented by the video frame data based on the Nth feature map FMN provided from the second layer L2, thereby recognizing the object and generating the recognition signal REC corresponding to the recognized object.

Referring to FIGS. 4A and 5A together, it is shown that the first accelerator 310 includes circuits that perform operations for lightening the deep learning model, and the second accelerator 320 includes circuits that perform a matrix-to-vector multiplication operation or a matrix-to-matrix multiplication operation, but embodiments are not limited thereto. According to various embodiments, the first accelerator 310 may further include an operation circuit for performing a GEMM operation or a GEMV operation. For example, the Nth operation circuit 31N of the first accelerator 310 may perform the GEMV operation or the GEMM operation.

Figure 6:
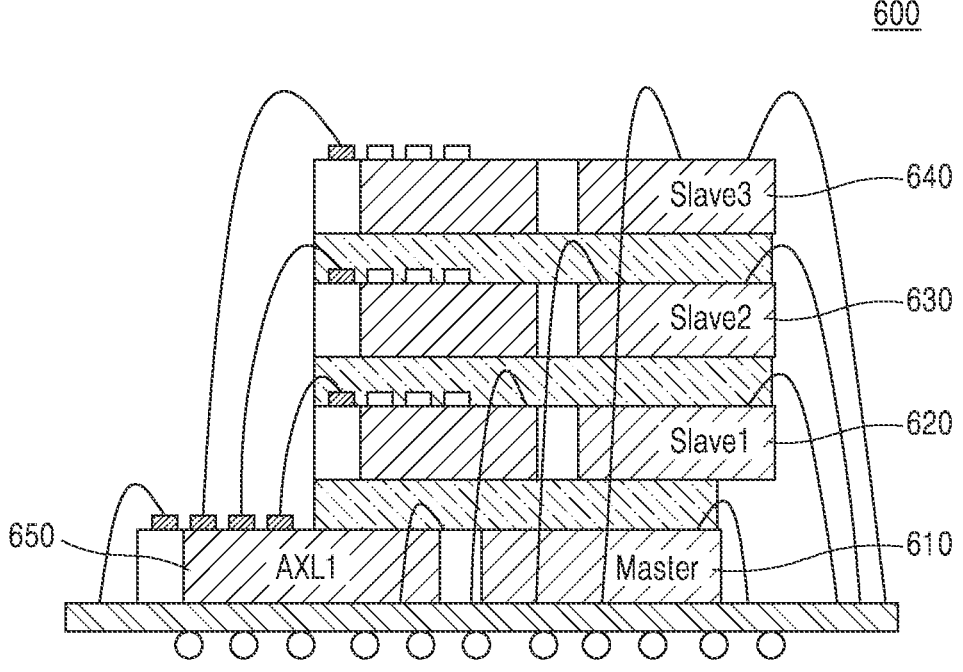
FIG. 6 illustrates an example implementation of a dynamic random access memory (DRAM) package according to an embodiment.

FIG. 6 illustrates an example implementation of a DRAM package 600 according to an embodiment.

The DRAM package 600 may correspond to any one of the plurality of DRAM packages 330-1 to 330-3 of FIG. 3.

The DRAM package 600 may include a plurality of DRAMs. The plurality of DRAMs may be three-dimensionally stacked. For example, the DRAM package 600 may include a first DRAM 610 to a fourth DRAM 640, and the first DRAM 610 to the fourth DRAM 640 may be sequentially stacked. For example, the first DRAM 610 may be disposed on a substrate and referred to as a master DRAM. The second DRAM 620 to the fourth DRAM 640 may be vertically stacked on the first DRAM 610 corresponding to the master DRAM. Each of the second DRAM 620 to the fourth DRAM 640 may be connected to the first DRAM 610 through wire bonding.

According to an embodiment, the first DRAM 610 may include a first accelerator 650. The first accelerator 650 may correspond to the first accelerator 310 of FIG. 3. That is, the first accelerator 650 may be implemented to be included in the first DRAM 610. When the first accelerator 650 is included in the first DRAM 610 of the master DRAM, the first accelerator 650 may be referred to as a process-in-memory (PIM). That is, the host 210 may be connected to the CXL-PIM type CXL device 220.

Figure 7:
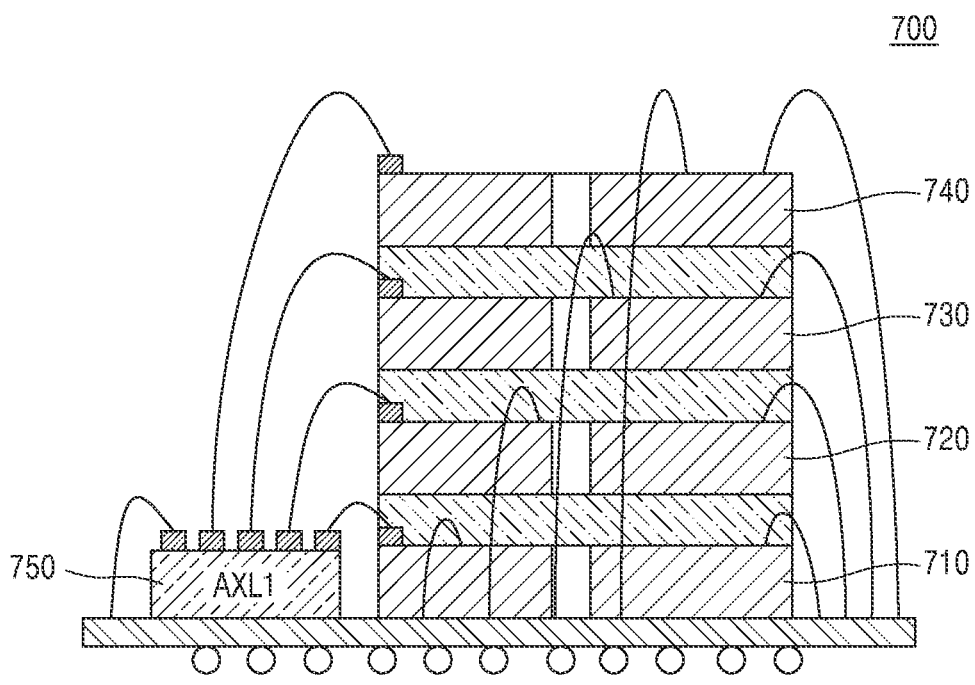
FIG. 7 illustrates an example implementation of a DRAM package according to an embodiment.

FIG. 7 illustrates an example implementation of a DRAM package 700 according to an embodiment.

Referring to FIG. 7, the DRAM package 700 is shown. The DRAM package 700 may correspond to any one of the plurality of DRAM packages 330-1 to 330-3 of FIG. 3.

The DRAM package 700 may include a plurality of DRAMs. The plurality of DRAMs may be three-dimensionally stacked. For example, the DRAM package 700 may include a first DRAM 710 to a fourth DRAM 740, and the first DRAM 710 to the fourth DRAM 740 may be sequentially stacked. For example, the first DRAM 710 may be disposed on a substrate, and the second DRAM 720 to the fourth DRAM 740 may be vertically stacked on the first DRAM 710.

According to an embodiment, the DRAM package 700 may further include a first accelerator 750 disposed on a separate die from the first DRAM 710. The first accelerator 750 may correspond to the first accelerator 310 of FIG. 3. Referring to FIG. 6, while the first accelerator 650 of the DRAM package 600 is included in the first DRAM 610, the first accelerator 750 of the DRAM package 700 may be disposed outside the first DRAM 710. The first accelerator 750 may be connected to each of the first DRAM 710 to the fourth DRAM 740. For example, the first accelerator 750 may be connected to each of the first DRAM 710 to the fourth DRAM 740 through wire bonding. When the first accelerator 750 is disposed on a separate die from the first DRAM 710 to fourth DRAM 740 that are three-dimensionally stacked, the first accelerator 750 may be referred to as a process-near-memory (PNM). That is, the host 210 may be connected to the CXL-PNM type CXL device 220.

Figure 8:
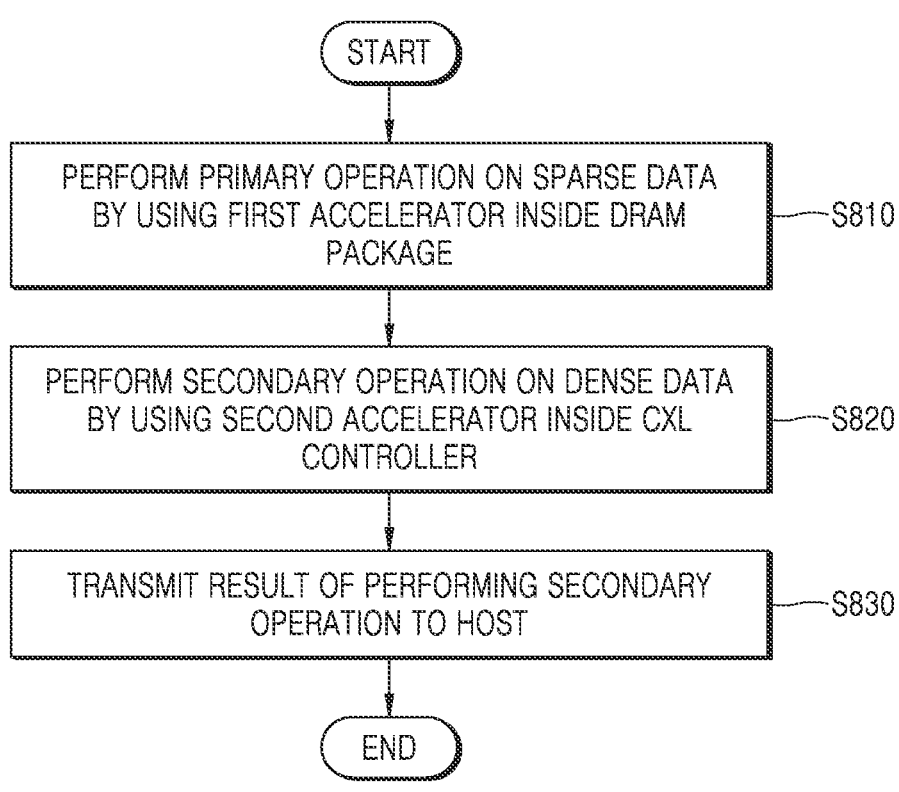
FIG. 8 is a flowchart illustrating an operating method of a compute express link (CXL) device according to an embodiment.

FIG. 8 is a flowchart illustrating an operating method of the CXL device 220 according to an embodiment.

Referring to FIG. 8, in operation S810, the CXL device 220 may perform a primary operation on sparse data by using a first accelerator inside a DRAM package. For example, referring to FIG. 6, the CXL device 220 may perform coarse acceleration by using the first accelerator 650 included in the first DRAM 610 of the DRAM package 600. The second DRAM 620 to the fourth DRAM 640 may provide the sparse data to the first DRAM 610 through a bonding wire, and the first accelerator 650 may perform the primary operation on the sparse data received from the first DRAM 610 to the fourth DRAM 640. As another example, referring to FIG. 7, the CXL device 220 may perform coarse acceleration by using the first accelerator 750 disposed on a separate die from the first DRAM 710 to the fourth DRAM 740 of the DRAM package 700. The first accelerator 750 may receive the sparse data from the first DRAM 710 to the fourth DRAM 740 through a bonding wire and perform the primary operation on the received sparse data. The primary operation may include at least a zeroing operation for removing less relevant data from the sparse data and a pruning operation for reducing the dimension of the sparse data by removing NULL data from the sparse data.

In operation S820, the CXL device 220 may perform a secondary operation on dense data by using the second accelerator 320 inside the CXL controller 250. The second accelerator 320 may receive the dense data from the first accelerator 650 or 750. The dense data may refer to result data of the primary operation on the sparse data. The second accelerator 320 may receive the dense data and perform operations necessary for performing an inference operation based on a neural network. For example, the second accelerator 320 may perform a matrix-to-vector multiplication operation or a matrix-to-matrix multiplication operation. According to various embodiments, the time required to perform operations S810 and S820 may be less than a CXL latency. For example, the CXL latency may be the maximum of 170 ns. That is, the time required for multistage acceleration by the first accelerator 310, 650 or 750 and the second accelerator 320 may be completed within the maximum of 170 ns.

In operation S830, the CXL device 220 may transmit a result of performing the secondary operation to the host 210. Because the host 210 according to the comparative example needs to receive a significant amount of data from a memory and directly perform an inference operation based on a neural network, power consumption due to frequent data transmission and reception may be large. In addition, because the data transfer speed between the host 210 and the CXL device 220 may be limited according to the PCIe5 specification, no matter how fast the transfer speed between the CXL device 220 and the DRAM packages 230 is, performance is still limited between the host 210 and the CXL device 220 by the PCIe5 specification. The CXL device 220 according to an embodiment performs the inference operation of the neural network and provides only the result to the host 210, and thus, frequent data transmission and reception may be omitted, thereby reducing power consumption. In addition, the CXL device 220 provides only the inference result of the neural network to the host 210, and thus, the transmission speed may not be limited by the PCIe5 specification, thereby obtaining performance improvement as the transmission speed of a DRAM increases.

As described above, the CXL device 220 may perform coarse acceleration by the first accelerator 310 and fine acceleration by the second accelerator 320, but embodiments are not limited thereto. According to various embodiments, the CXL device 220 may perform only an acceleration operation by the first accelerator 310 or only an acceleration operation by the second accelerator 320. A detailed description in this regard is described below with reference to FIGS. 9 and 10.

Figure 9:
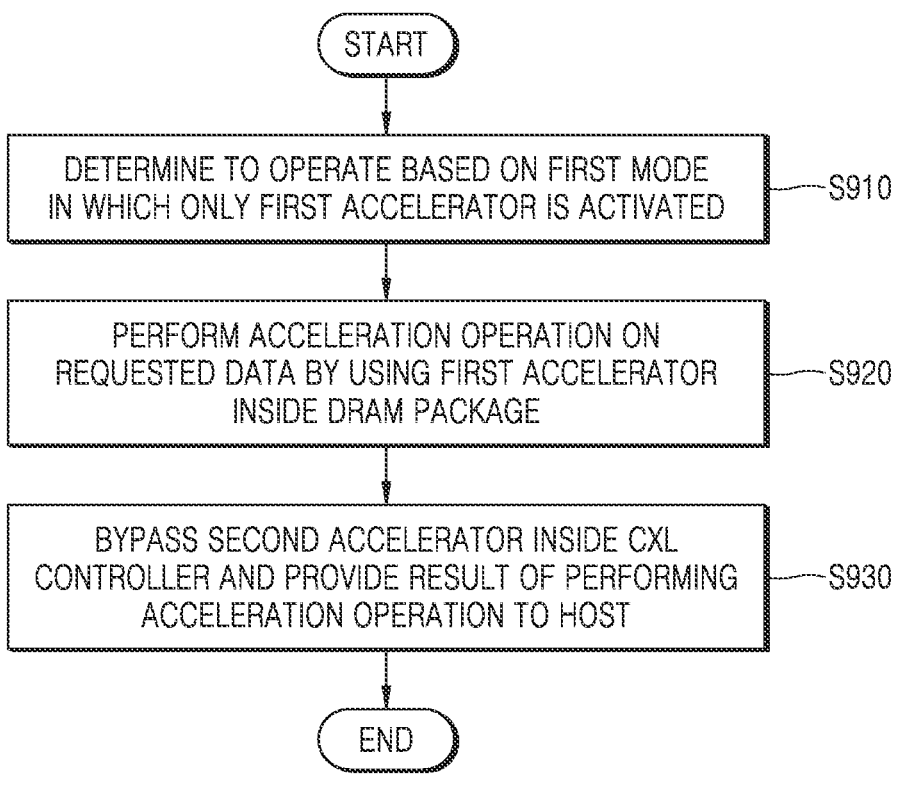
FIG. 9 is a flowchart illustrating an operating method of a CXL device according to an embodiment.

FIG. 9 is a flowchart illustrating an operating method of the CXL device 220 according to an embodiment.

Referring to FIG. 9, in operation S910, the CXL device 220 may determine to operate based on a first mode in which only the first accelerator 310 is activated. For example, the CXL device 220 may determine to activate only the first accelerator 310 in order to lighten parameters of a neural network. For another example, the CXL device 220 may determine to activate only the first accelerator 310 in advance to convert sparse data into dense data while not activating the second accelerator 320 and thereby not performing an inference operation. Specifically, a mode setting circuit 330 of the CXL device 220 may determine to operate in the first mode in which only the first accelerator 310 is activated, and generate a control signal for instructing the first mode. The mode setting circuit 330 may provide the control signal to each of the first accelerator 310 and the second accelerator 320. The first mode may be referred to as various terms including a coarse mode, a primary acceleration mode, and a first acceleration mode.

In operation S920, the CXL device 220 may perform an acceleration operation on requested data by using a first accelerator inside a DRAM package. For example, referring to FIG. 6, the CXL device 220 may perform the acceleration operation by using the first accelerator 650 included in the first DRAM 610 of the DRAM package 600. The second DRAM 620 to the fourth DRAM 640 may provide the requested data to the first DRAM 610 through a bonding wire, and the first accelerator 650 included in the first DRAM 610 may perform the acceleration operation by receiving the requested data from the second DRAM 620 to the fourth DRAM 640. When the requested data corresponds to sparse data, the acceleration operation is for parameter lightening, may include at least pruning, zeroing, and quantization, and may correspond to coarse acceleration. When the requested data corresponds to dense data, the acceleration operation may include at least one of a GEMM operation or a GEMV operation, and may correspond to fine acceleration.

As another example, referring to FIG. 7 together, the CXL device 220 may perform the acceleration operation by using the first accelerator 750 disposed on a separate die from the first DRAM 710 to the fourth DRAM 740 of the DRAM package 700. The first accelerator 750 may receive requested data from the first DRAM 710 to the fourth DRAM 740 through a bonding wire and perform the acceleration operation on the received requested data. When the requested data corresponds to sparse data, the acceleration operation is for parameter lightening including at least pruning, zeroing, and quantization, and may correspond to coarse acceleration. When the requested data corresponds to dense data, the acceleration operation may be at least one of the GEMM operation or the GEMV operation, and may correspond to fine acceleration.

In operation S930, the CXL device 220 may bypass the second accelerator 320 inside the CXL controller 250 and provide a result of performing the acceleration operation to the host 210. For example, the mode setting circuit 330 may provide a control signal indicating the first mode to the DRAM interface circuit 260. The DRAM interface circuit 260 may control a data transmission path so that data provided from the plurality of DRAM packages 330-1 to 330-3 is not provided to the second accelerator 320 and is directly provided to the CXL interface circuit 240, based on the control signal indicating the first mode. At the same time, the mode setting circuit 330 may provide the control signal indicating the first mode to the second accelerator 320. The second accelerator 320 may by controller to enter an inactive state based on the control signal indicating the first mode.

Figure 10:
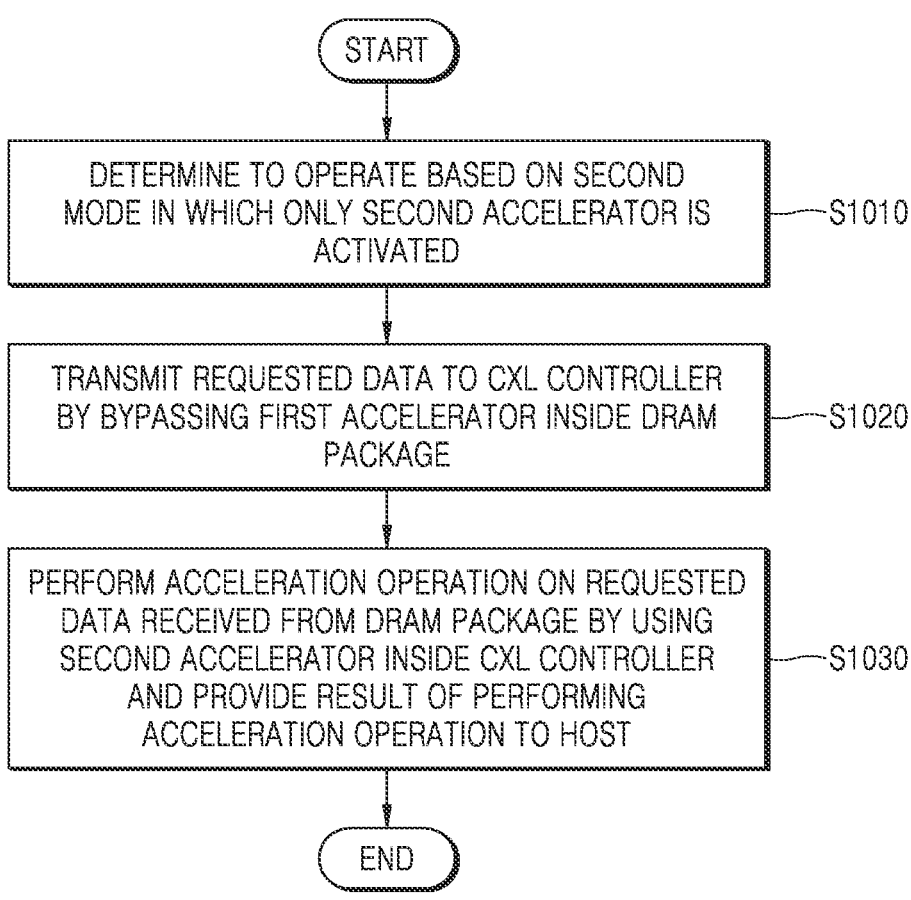
FIG. 10 is a flowchart illustrating an operating method of a CXL device according to an embodiment.

FIG. 10 is a flowchart illustrating an operating method of the CXL device 220 according to an embodiment.

Referring to FIG. 10, in operation S1010, the CXL device 220 may determine to operate based on a second mode in which only the second accelerator 320 is activated. For example, the CXL device 220 may determine to activate only the second accelerator 320 to directly perform inference based on a neural network on requested data stored in the plurality of DRAMs 231, 233, 235, and 237 after completing conversion into dense data in advance. Specifically, the mode setting circuit 330 of the CXL device 220 may determine to operate in the second mode in which only the second accelerator 320 is activated, and generate a control signal for indicating the second mode. The mode setting circuit 330 may provide the control signal to each of the first accelerator 310 and the second accelerator 320. The second mode may be referred to as various terms including a fine mode, a secondary acceleration mode, and a second acceleration mode.

In operation S1020, the CXL device 220 may transmit the requested data to the CXL controller 250 by bypassing a first accelerator inside a DRAM package. For example, referring to FIG. 3, the first accelerator 310 may receive the control signal indicating the second mode and may be deactivated based on the control signal. For example, referring to FIG. 6 together, the first accelerator 650 included in the first DRAM 610 of the DRAM package 600 may receive the control signal indicating the second mode and may be deactivated based on the control signal. Here, deactivation of the first accelerator 650 means that the first accelerator 650 does not perform an acceleration operation, and may refer to simply performing a function of transmitting requested data. The second DRAM 620 to the fourth DRAM 640 may provide the requested data to the first DRAM 610 through a bonding wire, and the first accelerator 650 included in the first DRAM 610 may receive and provide the requested data to the second accelerator 320 through the DRAM interface circuit 260.

As another example, referring to FIG. 7 together, the first accelerator 750 disposed on a separate die from the first DRAM 710 to the fourth DRAM 740 of the DRAM package 700 may receive the control signal indicating the second mode and may be deactivated based on the control signal. The first accelerator 750 may receive requested data from the first DRAM 710 to the fourth DRAM 740 through a bonding wire, and provide the received requested data to the second accelerator 320 through the DRAM interface circuit 260.

In operation S1030, the CXL device 220 may perform an acceleration operation on the requested data received from the DRAM package by using the second accelerator 320 inside the CXL controller 250, and provide a result of performing the acceleration operation to the host 210. For example, the mode setting circuit 330 may provide the control signal indicating the second mode to the DRAM interface circuit 260. The DRAM interface circuit 260 may control a data transmission path so that data provided from the plurality of DRAM packages 330-1 to 330-3 is provided to the second accelerator 320 and is not provided to the data to the CXL interface circuit 240, based on the control signal indicating the second mode.

FIG. 11 is a block diagram illustrating a system 1100 according to an embodiment.

Referring to FIG. 11, the system 1100 may be based on a DRAM interface. For example, the system 1100 may include a host 1110, a DRAM controller 1120, and a plurality of DRAM packages 1130-1 to 1130-3.

The host 1110 may correspond to the host processor 120 shown in FIG. 1 or the host 210 shown in FIGS. 2 and 3. Referring to FIG. 3 together, the system 1100 of FIG. 11 may be based on the DRAM interface rather than a CXL interface unlike the system 300 of FIG. 3. For example, as shown in FIG. 11, a first accelerator 1139 disposed in each of the DRAM packages 1130-1 to 1130-3 is identical to the first accelerator 310 of FIG. 3. However, the system 1100 of FIG. 11 further includes the DRAM controller 1120, and the DRAM controller 1120 may perform control between the host 1110 and the DRAM packages 1130-1 to 1130-3.

According to various embodiments, the first accelerator 1139 may receive sparse data from a plurality of DRAMs 1131, 1133, 1135, and 1137, perform a primary acceleration on the sparse data, and generate dense data. The first accelerator 1139 may provide the dense data to a second accelerator 1124 included in the DRAM controller 1120. The second accelerator 1124 may perform a secondary acceleration on the dense data received from the first accelerator 1139 and provide a result value of a neural network to the host 210. Even in the case of the system 1100 of FIG. 11, it will be apparent that the first accelerator 1139 or the second accelerator 1124 may be selectively activated to perform only one acceleration operation as in FIGS. 9 and 10. As described above, the system 1100 not based on the CXL interface may be based on the DRAM controller 1120 and the DRAM packages 1130-1 to 1130-3, but embodiments are not limited thereto. According to various embodiments, a system not based on the CXL interface may be based on an NVM including a plurality of NAND flash memories.

Figure 12:
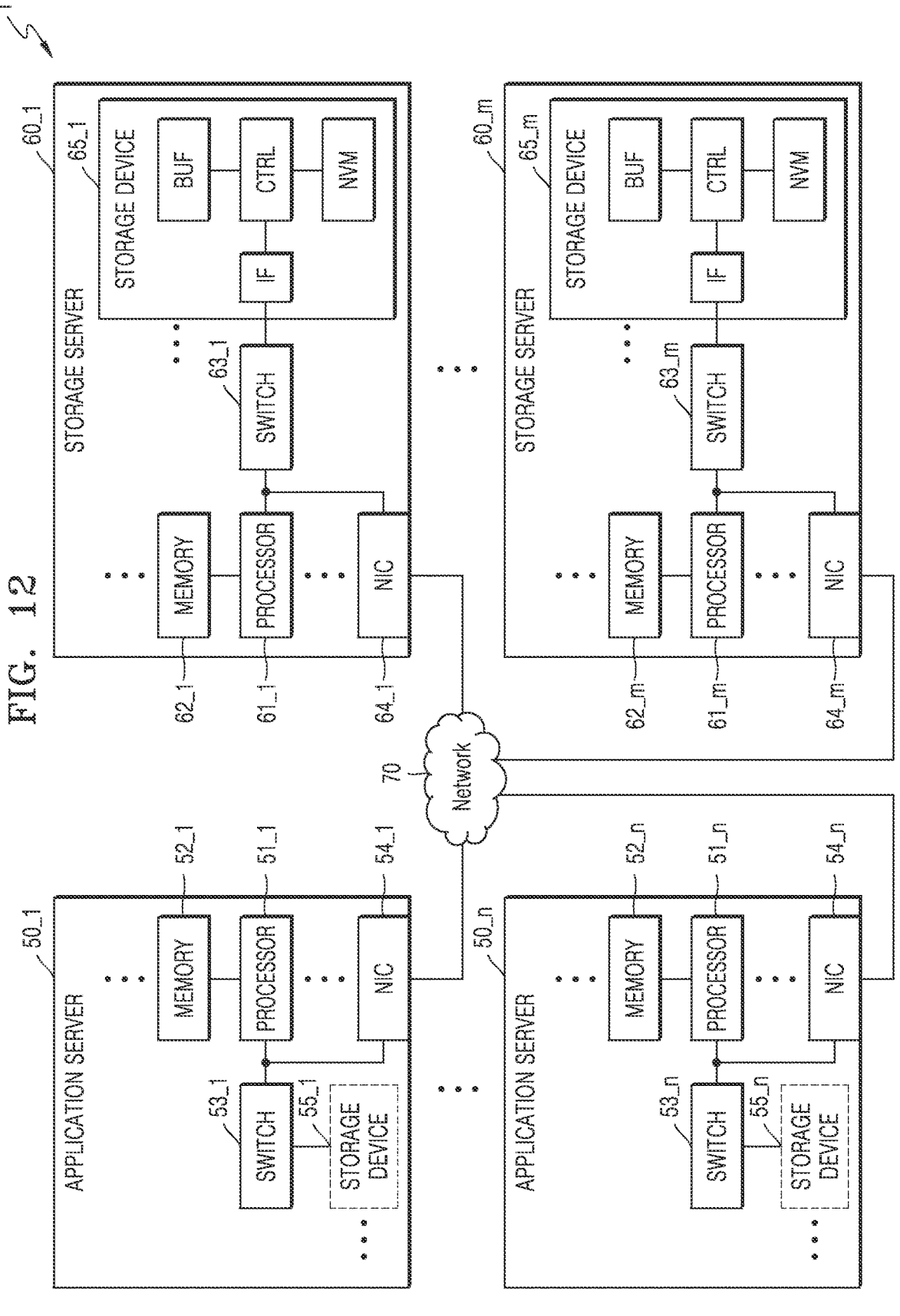
FIG. 12 is a block diagram illustrating a data center including a system according to an embodiment.

FIG. 12 is a block diagram illustrating a data center including a system according to an embodiment.

Referring to FIG. 12, in some embodiments, the system may be included in a data center 1 as an application server and/or a storage server. In addition, an embodiment related to selective and parallel error correction operations of a memory controller applied to some embodiments may be applied to each of the application server and/or the storage server.

Referring to FIG. 12, the data center 1 may collect various pieces of data and provide services, and may be referred to as a data storage center. For example, the data center 1 may be a system for operating a search engine and a database, or may be a computing system used by companies such as banks or government agencies. As shown in FIG. 12, the data center 1 may include application servers 50_1 to 50_n and storage servers 60_1 to 60_m (m and n are integers greater than 1). The number n of application servers 50_1 to 50_n and the number m of storage servers 60_1 to 60_m may be variously selected according to an embodiment, and the number n of application servers 50_1 to 50_n may be different from the number m of storage servers 60_1 to 60_m.

Each of the application servers 50_1 to 50_n may include at least one of processors 51_1 to 51_n, memories 52_1 to 52_n, switches 53_1 to 53_n, network interface controllers (NICs) 54_1 to 54_n, or storage devices 55_1 to 55_n. The processors 51_1 to 51_n may respectively control all operations of the application servers 50_1 to 50_n, access the memories 52_1 to 52_n, and execute instructions and/or data loaded into the memories 52_1 to 52_n. The memories 52_1 to 52_n may include, as non-limiting examples, double data rate synchronous DRAM (DDR SDRAM), high bandwidth memory (HBM), hybrid memory cube (HMC), dual in-line memory module (DIMM), Optane DIMM, or non-volatile DIMM (NVMDIMM).

According to an embodiment, the number of processors and memories included in the application servers 50_1 to 50_n may be variously selected. In some embodiments, the processors 51_1 to 51_n and the memories 52_1 to 52_n may provide a processor-memory pair. In some embodiments, the number of processors 51_1 to 51_n may be different from the number of memories 52_1 to 52_n. The processors 51_1 to 51_n may include single-core processors or multi-core processors. In some embodiments, as shown by dotted lines in FIG. 12, the storage devices 55_1 to 55_n may be omitted from the application servers 50_1 to 50_n. The number of storage devices 55_1 to 55_n included in the application servers 50_1 to 50_n may be variously selected according to an embodiment. The processors 51_1 to 51_n, the memories 52_1 to 52_n, the switches 53_1 to 53_n, the NICs 54_1 to 54_n, and/or the storage devices 55_1 to 55_n may communicate with each other through a link described above with reference to the drawings.

Each of the storage servers 60_1 to 60_m may include at least one of processors 61_1 to 61_m, memories 62_1 to 62_m, switches 63_1 to 63_m, NICs 64_1 to 64_n, or storage devices 65_1 to 65_m. The processors 61_1 to 61_m and the memories 62_1 to 62_m may operate similarly to the processors 51_1 to 51_n and the memories 52_1 to 52_n of the application servers 50_1 to 50_n described above.

The application servers 50_1 to 50_n and the storage servers 60_1 to 60_m may communicate with each other over a network 70. In some embodiments, the network 70 may be implemented by using a fiber channel (FC) or Ethernet, etc. The FC may be a medium used for relatively high-speed data transmission, and an optical switch providing high performance/high availability may be used. According to an access method of the network 70, each of the storage servers 60_1 to 60_m may be provided as file storage, block storage, or object storage.

In some embodiments, the network 70 may be a storage-only network, such as a storage area network (SAN). For example, the SAN may use an FC network and may be an FC-SAN implemented according to an FC protocol (FCP). Alternatively, the SAN may be an IP-SAN using a TCP/IP network and implemented according to an SCSI over TCP/IP or Internet SCSI (iSCSI) protocol. In some embodiments, the network 70 may be a general network such as a TCP/IP network. For example, the network 70 may be implemented according to a protocol such as FC over Ethernet (FCOE), network attached storage (NAS), NVMe over Fabrics (NVMe-oF), etc.

Hereinafter, the application server 50_1 and the storage servers 60_1 are mainly described, but it is noted that the description of the application server 50_1 may be applied to other application servers (e.g., 50_n), and the description of the storage server 60_1 may also be applied to other storage servers (e.g., 60_m).

The application server 50_1 may store data requested by a user or a client to be stored in one of the storage servers 60_1 to 60_m over the network 70. In addition, the application server 50_1 may obtain data requested to be read by the user or the client from one of the storage servers 60_1 to 60_m over the network 70. For example, the application server 50_1 may be implemented as a web server or a database management system (DBMS).

The application server 50_1 may access the memory 52_n and/or the storage device 55_n included in the other application server 50_n over the network 70, and/or may access the memories 62_1 to 62_m and/or the storage devices 65_1 to 65_m respectively included in the storage servers 60_1 to 60_m over the network 70. Accordingly, the application server 50_1 may perform various operations on data stored in the application servers 50_1 to 50_n and/or the storage servers 60_1 to 60_m. For example, the application server 50_1 may execute instructions for moving or copying data between the application servers 50_1 to 50_n and/or the storage servers 60_1 to 60_m. At this time, the data may respectively move from the storage devices 65_1 to 65_m of the storage servers 60_1 to 60_m to the memories 52_1 to 52_n of the application servers 50_1 to 50_n through the memories 62_1 to 62_m of the storage servers 60_1 to 60_m or directly. In some embodiments, data moving over the network 70 may be encrypted data for security or privacy.

In the storage server 60_1, an interface IF may provide a physical connection between the processor 61_1 and a controller CTRL and a physical connection between the NIC 64_1 and the controller CTRL. For example, the interface IF may be implemented in a direct attached storage (DAS) method that directly connects the storage device 65_1 with a dedicated cable. Also, for example, the interface IF may be implemented in various interface methods such as Advanced Technology Attachment (ATA), Serial ATA (SATA), external SATA (e-SATA), Small Computer Small Interface (SCSI), Serial Attached SCSI (SAS), PCI, PCIe, NVM express (NVMe), IEEE 1394, USB, secure digital (SD) card, multimedia card (MMC), embedded multi-media card (eMMC), Universal Flash Storage (UFS), embedded Universal Flash Storage (eUFS), compact flash (CF) card interface, etc.

In the storage server 60_1, the switch 63_1 may selectively connect the processor 61_1 to the storage device 65_1 or selectively connect the NIC 64_1 to the storage device 65_1 under the control of the processor 61_1.

In some embodiments, the NIC 64_1 may include a network interface card, network adapter, etc. The NIC 64_1 may be connected to the network 70 through a wired interface, a wireless interface, a Bluetooth interface, an optical interface, etc. The NIC 64_1 may include an internal memory, a DSP, a host bus interface, etc., and may be connected to the processor 61_1 and/or the switch 63_1 through the host bus interface. In some embodiments, the NIC 64_1 may be integrated with at least one of the processor 61_1, the switch 63_1, or the storage device 65_1.

In the application servers 50_1 to 50_n or the storage servers 60_1 to 60_m, the processors 51_1 to 51_m and 61_1 to 61_n may program or read data by transmitting commands to the storage devices 55_1 to 55_n and 65_1 to 65_m or the memories 52_1 to 52_n and 62_1 to 62_m. In this regard, the data may be error-corrected data through an error correction code (ECC) engine. The data, which is data on which data bus inversion (DBI) or data masking (DM) is processed, may include cyclic redundancy code (CRC) information. The data may be encrypted data for security or privacy.

The storage devices 55_1 to 55_n and 65_1 to 65_m may transmit control signals and command/address signals to a non-volatile memory (NVM) device (e.g., a NAND flash memory device) in response to read commands received from the processors 51_1 to 51_m and 61_1 to 61_n. Accordingly, when data is read from the NVM device, a read enable signal may serve to be input as a data output control signal and output data to a DQ bus. A data strobe signal may be generated by using the read enable signal. The command and address signals may be latched according to a rising edge or a falling edge of a write enable signal.

The controller CTRL may control the overall operation of the storage device 65_1. In an embodiment, the controller CTRL may include static random access memory (SRAM). The controller CTRL may write data into the NVM device in response to a write command, or may read data from the NVM device in response to a read command. For example, the write command and/or the read command may be generated based on a request provided from a host, for example, the processor 61_1 in the storage server 60_1, the processor 61_m in the other storage server 60_m, or the processors 51_1 to 51_n in the application servers 50_1 to 50_n. A buffer BUF may temporarily store (buffer) data to be written in the NVM device or data read from the NVM device. In some embodiments, the buffer BUF may include a DRAM. Also, the buffer BUF may store meta data, and the meta data may refer to user data or data generated by the controller CTRL to manage the NVM device. The storage device 65_1 may include a secure element (SE) for security or privacy.

Figure 13:
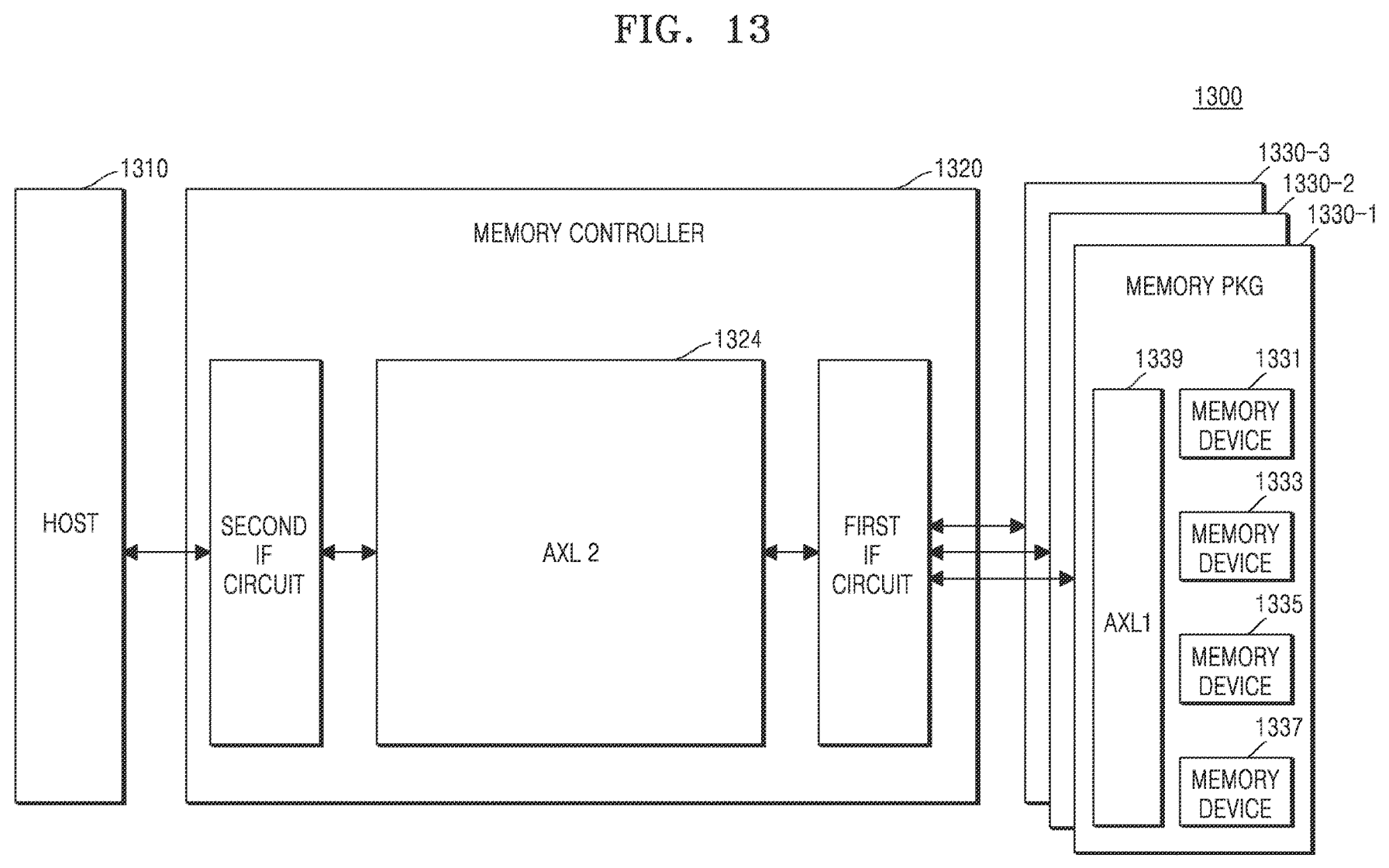

FIG. 13 is a block diagram illustrating a system according to an embodiment. Descriptions redundant with those of FIGS. 3 and 11 are omitted.

Referring to FIG. 13, a host 1310 may communicate with a memory controller through a second interface circuit. For example, the host 1310 may request a result of inference by using a neural network from a memory controller 1320, and the memory controller 1320 may provide the result of the inference to the host 1310 as output data.

The memory controller 1320 may include a second accelerator 1324. The second accelerator 1324 may perform an acceleration operation based on data received from memory packages 1330-1 to 1330-3 and provide a result of the acceleration operation to the host 1310. According to various embodiments, the memory controller 1320 may be a DRAM controller or a CXL device including a CXL controller when each of a plurality of memory devices 1331 to 1337 is a DRAM. In addition, the memory controller 1320 is not limited thereto, and may be a controller to which various types of protocols including at least DDR, LPDDR, NVMe, eMMC, and UFS are applied. Each of the first interface circuit and the second interface circuit included in the memory controller 1320 may be a circuit for supporting various interfaces including at least ATA, SATA, e-SATA, SCSI, SAS, PCI, PCIe, NVMe, IEEE 1394, USB, SD card, MMC, eMMC, UFS, eUFS, and CF card interface.

Each of the memory packages 1330-1 to 1330-3 may include a plurality of memory devices 1331, 1333, 1335, and 1337. The memory packages 1330-1 to 1330-3 may each include a first accelerator 1339 receiving data from the plurality of memory devices 1331 to 1337 and performing an acceleration operation based on the received data. According to various embodiments, the plurality of memory devices 1331 to 1337 may correspond to various types of memory devices including at least DRAM, NAND flash, MRAM, FeRAM, DDR SDRAM, HBM, HMC, DIMM, Optane DIMM, or NVMDIMM.

According to an embodiment, each of the memory packages 1330-1 to 1330-3 may perform a primary operation on sparse data by using the first accelerator 1339. The first accelerator 1339 may perform the primary operation or coarse acceleration on the sparse data received from the plurality of memory devices 1331 to 1337. The primary operation may include at least a zeroing operation for removing less relevant data from the sparse data and a pruning operation for reducing the dimension of the sparse data by removing NULL data from the sparse data.

According to an embodiment, the memory controller 1320 may perform a secondary operation on dense data by using the second accelerator 1324 inside the memory controller 1320. The second accelerator 1324 may receive the dense data from the first accelerator 1339. The dense data may refer to result data of the primary operation on the sparse data. The second accelerator 1324 may receive the dense data and perform operations necessary for performing an inference operation based on a neural network. For example, the second accelerator 1324 may perform a matrix-to-vector multiplication operation or a matrix-to-matrix multiplication operation. According to various embodiments, the time required to perform the primary operation and the secondary operation may be less than a predefined threshold value corresponding to an interface-specific latency.

According to an embodiment, the memory controller 1320 may transmit a result of performing the secondary operation to the host 1310. The memory controller 1320 according to an embodiment may perform an inference operation of a neural network and provide only the result to the host 1310, and thus, frequent data transmission and reception may be omitted, thereby reducing power consumption.

In some embodiments, each of the components represented by a block as illustrated in FIGS. 1-3, 4A, 5A AND 11-13 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. An electronic device comprising:
a memory package comprising a plurality of memory devices and a first accelerator circuit configured to receive first data from the plurality of memory devices and perform a coarse acceleration operation based on the first data to obtain second data, wherein the coarse acceleration operation comprises a filtering operation performed based on the first data; and
a memory controller comprising a second accelerator circuit configured to receive the second data from the first accelerator circuit and perform a fine acceleration operation based on a neural network and the second data to obtain an inference result.

2. The electronic device of claim 1, wherein the plurality of memory devices correspond to dynamic random access memories (DRAMs) which are three-dimensionally stacked,
wherein the first accelerator circuit is provided in a master DRAM, among the DRAMs, which is in contact with a substrate, and
wherein, other than the master DRAM, the DRAMs are connected to the master DRAM through wire bonding.

3. The electronic device of claim 1, wherein the plurality of memory devices correspond to DRAMs which are stacked on a first die,
wherein the first accelerator circuit is provided on a second die different from the first die, and
wherein the DRAMs are connected to the first accelerator circuit through wire bonding.

4. The electronic device of claim 1, wherein the filtering operation comprises a zeroing operation in which, among the first data, a portion having a size smaller than a threshold value is changed into zero to obtain filtered data, and
wherein the coarse acceleration operation comprises a pruning operation in which zero data and NULL data are removed from the filtered data to obtain the second data.

5. The electronic device of claim 1, wherein the fine acceleration operation comprises a general matrix vector multiplication (GEMV) operation of matrix-to-vector multiplication and a general matrix-matrix multiplication (GEMM) operation of matrix-to-matrix multiplication.

6. The electronic device of claim 1, wherein the memory controller is configured to control one of the coarse acceleration operation and the fine acceleration operation to be selectively performed.

7. The electronic device of claim 1, wherein the memory controller further comprises:
a decoder configured to decode instructions received from a host to obtain decoded instructions; and a command generator configured to generate a command for controlling the plurality of memory devices based on the decoded instructions.

8. The electronic device of claim 1, wherein a time required for the coarse acceleration operation and the fine acceleration operation is less than a predefined threshold value.

9. The electronic device of claim 1, wherein the memory controller corresponds to a compute express link (CXL) device,
wherein the electronic device further comprises:
a first interface circuit configured to interface with a host; and
a second interface circuit configured to interface with the memory package, and
wherein the first interface circuit is configured to communicate with the host based on a peripheral component interconnect express (PCIe) protocol.

10. A memory controller comprising:
a register configured to receive instructions from a host;
a decoder configured to decode the instructions;
a command generator configured to generate a command to be provided to a memory package based on the decoded instructions, wherein the memory package comprises a plurality of memory devices; and
a first accelerator circuit configured to receive second data from the memory package and perform first operations for an inference operation based on a neural network,
wherein the second data is data obtained as a result of performing second operations on first data stored in the plurality of memory devices through a second accelerator circuit provided in the memory package, wherein the second operations comprise a filtering operation performed based on the first data.

11. The memory controller of claim 10, wherein the plurality of memory devices correspond to dynamic random access memories (DRAMs) which are three-dimensionally stacked inside the memory package,
wherein the second accelerator circuit is provided in a master DRAM contacting a substrate of the memory package, and
wherein, other than the master DRAM, the DRAMs are connected to the master DRAM through wire bonding.

12. The memory controller of claim 10, wherein the plurality of memory devices correspond to DRAMs which are three-dimensionally stacked on a first die inside the memory package,
wherein the second accelerator circuit is provided on a second die different from the first die, and
wherein the DRAMs are connected to the second accelerator circuit through wire bonding.

13. The memory controller of claim 10, wherein the filtering operation comprises a zeroing operation in which, among the first data, a portion having a size smaller than a threshold value is changed into zero to obtain filtered data, and
wherein the second operations comprise a pruning operation in which zero data and NULL data are removed from the filtered data to obtain the second data.

14. The memory controller of claim 10, wherein the first operations comprise a general matrix vector multiplication (GEMV) operation of matrix-to-vector multiplication and a general matrix-matrix multiplication (GEMM) operation of matrix-to-matrix multiplication.

15. The memory controller of claim 10, wherein the memory controller is configured to selectively perform one of the first operations based on the first accelerator circuit or the second operations based on the second accelerator circuit.

16. The memory controller of claim 10, wherein a time required for the first operations and the second operations is less than a predefined threshold value.

17. An operating method of a memory controller connected to a memory package comprising a plurality of memory devices, the operating method comprising:

> receiving output data from a first accelerator circuit which has performed a coarse acceleration operation on sparse data stored in the plurality of memory devices to obtain the output data, wherein the coarse acceleration operation comprises a filtering operation performed based on the sparse data;
>
> obtaining an inference result by performing a fine acceleration operation on the output data by using a second accelerator circuit inside the memory controller; and
>
> providing the inference result to a host.

18. The operating method of claim 17, wherein the filtering operation comprises a zeroing operation in which, among the sparse data, a portion having a size smaller than a threshold value is changed into zero to obtain filtered data, > wherein the coarse acceleration operation comprises a pruning operation in which zero data and NULL data are removed from the filtered data to obtain the output data, and wherein the fine acceleration operation comprises a general matrix vector multiplication (GEMV) operation of matrix-to-vector multiplication and a general matrix-matrix multiplication (GEMM) operation of matrix-to-matrix multiplication.

19. The operating method of claim 17, wherein the plurality of memory devices correspond to dynamic random access memories (DRAMs) which are three-dimensionally stacked, > wherein the first accelerator circuit is provided in a master DRAM contacting a substrate among the DRAMs, and
>
> wherein, other than the master DRAM, the DRAMs are connected to the master DRAM through wire bonding.

20. The operating method of claim 17, wherein the plurality of memory devices correspond to DRAMs which are three-dimensionally stacked on a first die, > wherein the first accelerator circuit is provided on a second die different from the first die, and
>
> wherein the DRAMs are connected to the first accelerator circuit through wire bonding.

* * * * *